United States Patent

[11] 3,593,631

| [72] | Inventor | Edwin H. Land<br>Cambridge, Mass. |
|---|---|---|
| [21] | Appl. No. | 878,086 |
| [22] | Filed | Nov. 19, 1969 |
| [45] | Patented | July 20, 1971 |
| [73] | Assignee | Polaroid Corporation<br>Cambridge, Mass. |

[54] PHOTOGRAPHIC APPARATUS HAVING AUTOMATIC TEMPERATURE COMPENSATED FILM SPEED INSERTION
17 Claims, 8 Drawing Figs.

| [52] | U.S. Cl. | 95/10C, 95/13, 95/31 FS |
|---|---|---|
| [51] | Int. Cl. | G03b 7/08, G03b 7/22 |
| [50] | Field of Search | 95/10 C, 13, 31 R, 31 FS; 352/72, 78, 141 |

[56] References Cited
UNITED STATES PATENTS

| 3,295,424 | 1/1967 | Biber | 95/10 (C) |
| 3,351,413 | 11/1967 | Kono | 352/141 X |
| 3,460,450 | 8/1969 | Ogihara | 95/10 (C) |
| 3,461,786 | 8/1969 | Sato et al. | 352/141 |
| 3,492,927 | 2/1970 | Thiece et al. | 95/10 (C) |

*Primary Examiner*—Samuel S. Matthews
*Assistant Examiner*—Joseph F. Peters, Jr.
*Attorneys*—Brown and Mikulka, William D. Roberson and Gerald L. Smith

ABSTRACT: Photographic apparatus in which film is exposed and then processed as an adjunct to that exposure. Exposure is performed by an automatic exposure control system which compensates for deviations of ambient temperature from an optimum value for development by adjusting exposure values. A thermistor attached to a film cassette is used for inserting film speed data as well as temperature responsive exposure compensation into the exposure control system of the apparatus.

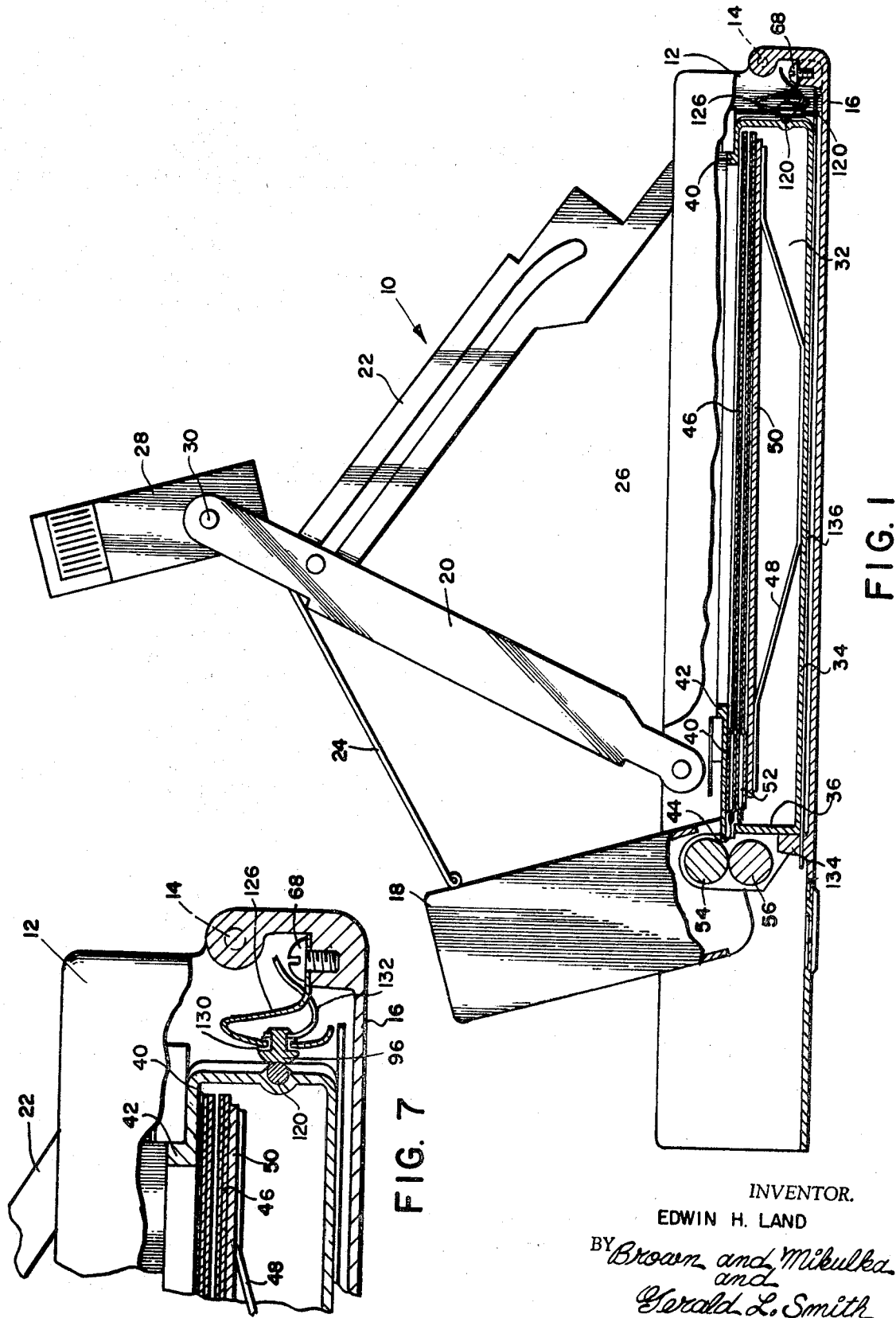

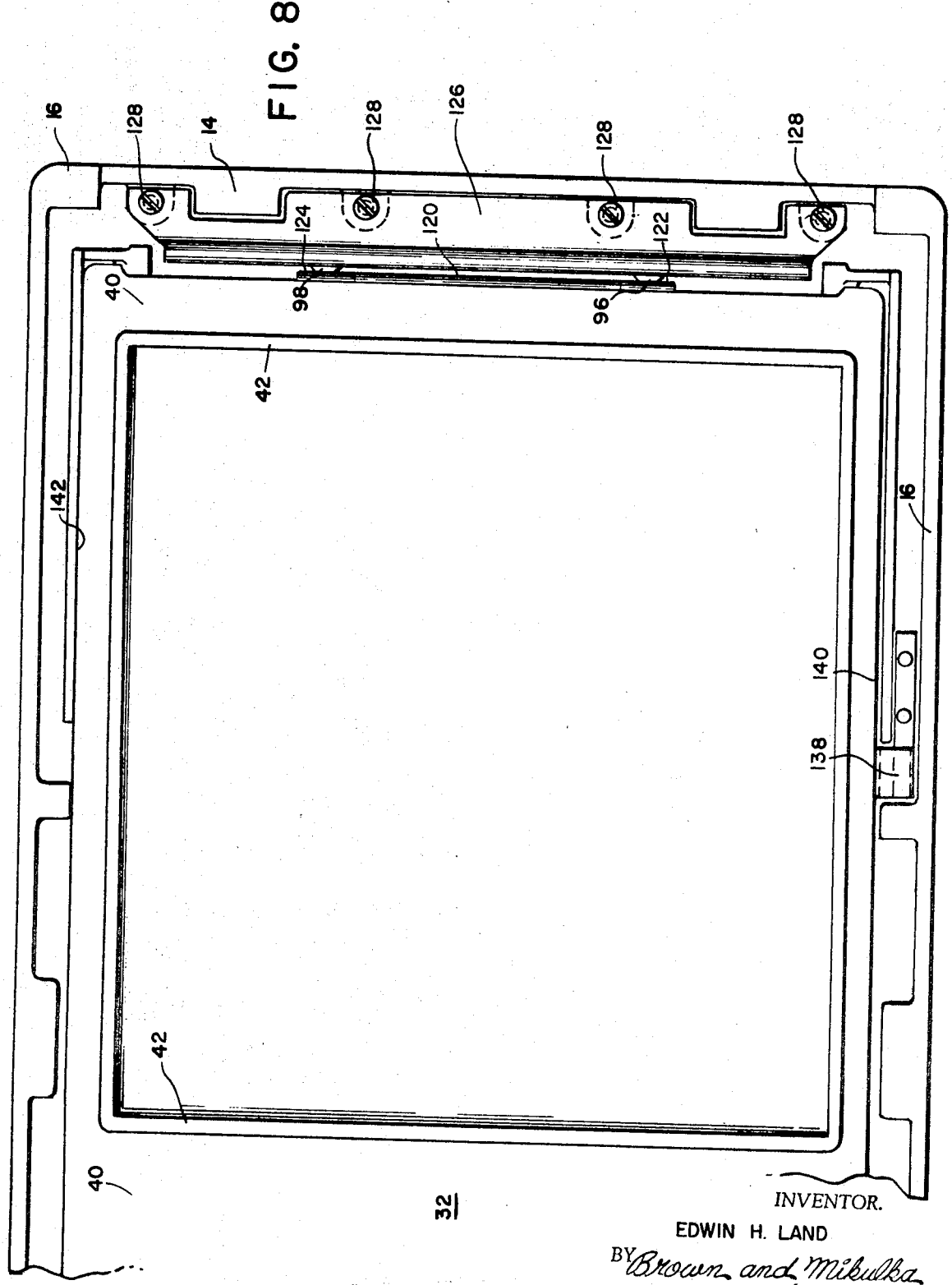

PHOTOGRAPHIC APPARATUS HAVING AUTOMATIC TEMPERATURE COMPENSATED FILM SPEED INSERTION

BACKGROUND OF THE INVENTION

Latent images of subjects can be formed within a photographic film under a somewhat broad range of temperature conditions. Following formation of the latent image, the exposed film carrying it conventionally is developed separately within a carefully controlled processing environment.

Where photographic exposures are made with cameras in which processing takes place as an adjunct to film exposure, for instance immediately following an exposure, the temperature at which the camera is operated will influence developed image formation. This influence is particularly distinct with photographic systems employing diffusion transfer color processes. One such color diffusion transfer process employs a film unit incorporating a donor component which is oriented within a camera for exposure and a resultant creation therewith of a latent image. The latent image is formed within a select number of spectrally sensitive silver halide layers. These layers are provided in superposed functional relationship with select developer dyes representing color components within a subtractive color system. During a development process immediately following exposure, an image-receiving or receptor sheet is superposed with the donor component and a processing solution is interposed between them for a predetermined imbibition period. During this period, the latent image is developed within the silver halide layers and an imagewise distribution of components of the dye layers in transferred from the donor component into the receptor sheet to form a color image. This process is described in detail in U.S. Pat. No. 2,983,606 by H. G. Rogers. Another diffusion transfer color system in which the image-receiving layer of the composite film structure is formed integrally with and need not be separated from superposed contact with the photosensitive donor assembly is described in U.S. Pat. No. 3,415,644 by Edwin H. Land.

Each of the above processes represents a balanced system under optimum conditions of temperature and imbibition interval timing, this balance being related to such considerations as the induction period of development of the halide layers as well as the migration or diffusion characteristics of the dyes within the donor assembly. The balance is substantially maintained over a latitude of ambient temperatures most frequently encountered in conventional photographic practice. However, subjective improvement of transfer color image quality may be realized by altering the amount of exposure normal for optimum temperature conditions in correspondence with deviations from such optimum temperatures.

The extent of alteration has been determined to be of a relatively minor magnitude, representing a form of trim to a preselection of such exposure parameters as exposure interval and effective aperture. To insert this adjustment, however, additional manipulative steps are required of a camera operator. Ambient or development temperature must be determined. Next, the amount of exposure parameter trim appropriate for such temperature conditions must be determined and adjustively inserted within an exposure control mechanism. The burden thus imposed upon the operator militates against a general effort of the photographic industry to lessen the number of steps required to prepare a camera for making an exposure. Paramount among improvements in the latter regard are electronic automatic exposure control systems. These systems evaluate scene brightness, weight this evaluation with respect to the sensitometric characteristics of a film being exposed and automatically regulate one or more exposure control parameters in correspondence with the weighted evaluation. The automatic control systems still require a preliminary adjustment for permitting their operation in accordance with the particular speed or similar property of the film being used with a camera.

To lessen the possibilities for inadvertent failure to make the adjustments for photographic properties of the film including speed as well as development temperature, it is desirable that they be performed as an adjunct to such basic preparatory steps as inserting a film cassette within a camera. Any such technique for automatically inserting sensitometric and development temperature trim data into the control systems should employ film cassette modifications in keeping with the low fabrication costs of disposable film retaining structures. Further, the film speed input and temperature trim should automatically adjust the exposure systems in accordance with minor manufacturing variations in the sensitometric properties of the films. Accordingly, a data insertion arrangement should be amenable to simple calibration procedures on a high volume production scale. While fabrication considerations require that the film speed and temperature trim insertion arrangements be of simple design, the design must be such that opportunities for sustaining damage during normal film handling will be present only at statistically dismissible frequencies. Further, a proper coupling of such arrangements into the exposure system of a camera in conjunction with the insertion of a film pack or the like must be assured.

SUMMARY OF THE INVENTION

The present invention is addressed to photographic apparatus incorporating a film retaining cassette structure which is operative to automatically insert both sensitometric and development temperature exposure compensation information into an automatic electronic exposure control system.

Temperature responsive photographic property data is inserted into the control systems as a temperature varying but predetermined electrical resistance present between two terminal surface areas of a selectively dimensioned thermally responsive electrical resistor component. This component, which may be a thermistor of rod, tape or the like forms, is affixed to an external surface of a film cassette structure. The thermistor is positioned upon the cassette structure in a manner wherein it makes circuit completing contact with spring loaded contact members permanently mounted within a camera housing.

Coupled to the cassette structure, the thermally responsive resistance element is automatically positioned within the processing environment of a self-developing camera. As a consequence, proper sensitometric data and development temperature compensation of the exposure regulating system of the camera is assured without requiring operator attendance.

A further object and feature of the invention is to provide photographic apparatus having a cassette structure incorporating a selectively positioned thermistor adapted for circuit completing contact with input terminals of the film speed amplification stage of an automatic electronic exposure control circuit. This amplification stage is coupled to receive the output signals of a light sensing circuit. By controlling the gain of the amplification stage to selectively adjust such output signals, the control system may be conformed both to the sensitometric properties of a particular photographic film as well as for compensation required due to the temperature at which the camera is operated.

The invention accordingly comprises the system and apparatus possessing the features, technique and properties which are exemplified in the description to follow hereinafter and the scope of the invention is indicated in the appended claims.

BRIEF DESCRIPTION OF THE DRAWINGS:

FIG. 1 is a side view, partly in section, showing a folding camera of the self-developing variety in its operative position and embodying the instant invention;

FIG. 7 is a fragmentary side view of the camera of FIG. 1 having portions broken away to reveal the internal structure; and FIG. 8 is a top view of the receiving chamber portion of the camera of FIG. 1.

DETAILED DESCRIPTION

Figure 3:
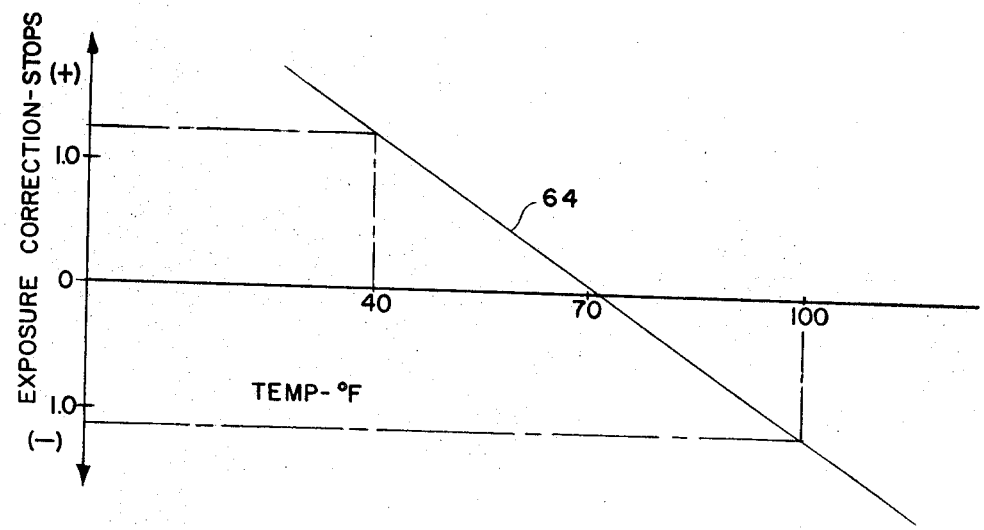
FIG. 3 is a graph relating exposure trim or adjustment with ambient temperature.

In a preferred embodiment of the instant invention sensitometric data including film speed as well as exposure compensation due to camera operating temperature is automatically inserted into a photographic control system from a temperature responsive resistive element affixed to a film cassette. The resistive element may take the form of a thermistor of rod or tape configuration which is affixed to one side of the film cassette body. The thermistor is arranged to make contact with spring loaded contact members fixed within a camera housing and the resistance present between these contacts for any given temperature is inserted through appropriate circuitry into a film speed control stage of an automatic exposure control system.

After the film cassette is inserted within the camera, the temperature responsive thermistor attached to it will assume the temperature of the exposure chamber within which the cassette is inserted. Thus disposed, it will assume a resistance value appropriately altered for trimming or correcting the amount of exposure in correspondence with the temperature at which film processing will occur.

Referring to FIG. 1, a folding camera of the self-developing type is portrayed generally at 10. The housing of camera 10 is shown in its erected position and includes a top supporting section 12 which is hinged at 14 to a bottom cover 16. Hinged to the forward end of top supporting section 12 is an exposure regulator housing 18. Housing 18 is designed to retain a photographic taking lens, shutter and aperture mechanisms as well as circuits for controlling their actuation. Camera 10 is erected to the operative position shown by an erecting linkage on either side of the camera, the components of one side of the linkage being shown at 20 and 22. The erecting linkage supports a flexible, lighttight exposure chamber formed having a top wall as at 24, a rear reflective wall juxtaposed to component 22, and flexible sidewalls therebetween at 26. Linkage component 22 is pivotally joined with top supporting section 12 as well as bottom cover 16 at hinge 14. A rangefinder-viewfinder housing 28 is pivotally coupled to erecting linkage component 20 at 30. When collapsed, the camera 10 components are capable of folding substantially within the confines of bottom cover 16. For other details of the camera 10, reference is made to copending U.S. applications for Pat., Ser. No. 824,097 by Irving Erlichman filed May 13, 1969 and Ser. No. 764,142 by Irving Erlichman et al., filed Oct. 1, 1968, both applications being assigned to the assignee of the instant application.

Photographic film used with the camera 10 is retained within a disposable cassette shown generally at 32. Cassette 32 is formed as a shallow box having a bottom surface 34, sidewalls 36 and 38 and a forward wall 40. Forward wall 40 is configured defining a film frame opening, the periphery of which is shown at 42. An elongate slot 44 is positioned between sidewall 36 and forward wall 40. Cassette 32 retains a number of film units 46 in position for sequential exposure at film frame opening 42. The units 46 are biased upwardly into position at film frame opening 42 by a spring 48 which engages a platenlike member 50. Exposure of the uppermost of the film units 46 is made from an optical path passing through an objective lens within the exposure regulator housing 18 and reflecting from the inward surface of the back portion of the camera 10 to the film frame opening 42. Film units 46 are fully described in the earlier cited patent of Edwin H. Land and each include all of the material necessary to produce a positive photographic print including a photosensitive element, an image receiving element which is transparent and is secured in face-to-face relation with the photosensitive element and a rupturable container as at 52 of processing liquid. A container 52 is secured at the leading edge of each film unit 46 and functions to dispense its liquid contents between the layered elements of the unit in response to an applied pressure.

Following an exposure of an uppermost film unit 46, the unit is drawn through elongate slot 44 to be engaged by and moved between a pair of pressure applying rolls 54 and 56 which rupture containers 52 and cause a select dispensation of their liquid contents upon the photosensitive and image-receiving elements of each unit 46. It will be apparent, therefore, that the temperature at which the processing of film units 46 takes place will substantially correspond with the temperature of the receiving chamber within which the film is disposed. In general photographic practice, this temperature will vary, for instance, between minimum and maximum levels of about 40° F to 105° F.

Figure 2:
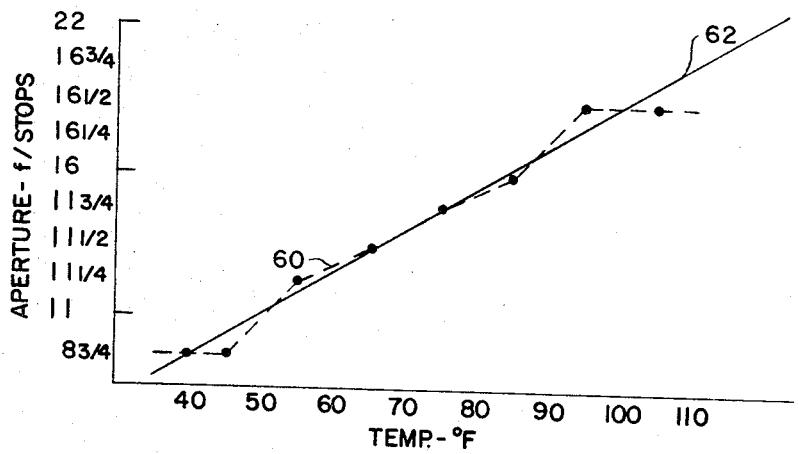
FIG. 2 is a curve derived from a controlled test of the effect of exposure variation with ambient temperature using a camera of the self-developing variety.

Referring to FIG. 2, the results of an analysis of the effect of both temperature and exposure upon the color image evolved from photographic film employing self-developing diffusion transfer color processes is revealed. The points defining dashed curve 60 were obtained by making studio photographs within a controlled environment wherein a camera incorporating a self-contained developing system and film therewithin were allowed to come to equilibrium at the temperatures indicated. A plurality of exposures were made and processed at these temperatures and a subjective evaluation of the best exposures was made. Over the temperature range indicated, the best exposures were produced by varying relative aperture over a range from about $f/9$ to $f/22$. A normalization of dashed curve 60 is shown at solid line 62. Note that a variation of about 1 ¾ stops was made over a temperature range from 40° F to 100° F.

Turning to FIG. 3, the amount of exposure trim or compensation desirable when such photographic systems are used at temperatures above or below a predetermined optimum developing temperature of 70° F is revealed. Note that at temperatures below 70° F the amount or value of exposure is increased and at temperatures above 70° F the amount or value of exposure is correspondingly decreased. For convenience, the correction is indicated as being negative for the latter temperature range and of a positive nature for the former temperature range. The technique for inserting the exposure trim may be provided by adjusting an aperture mechanism and/or by inserting an equivalent exposure value adjustment into the exposure interval timing system of a shutter mechanism. The present invention provides an automatic insertion of the temperature compensating correction in conjunction with the insertion of film speed data into a camera. The latter insertion is provided by the coupling of a resistance of select value into an automatic exposure control system.

Figure 4:
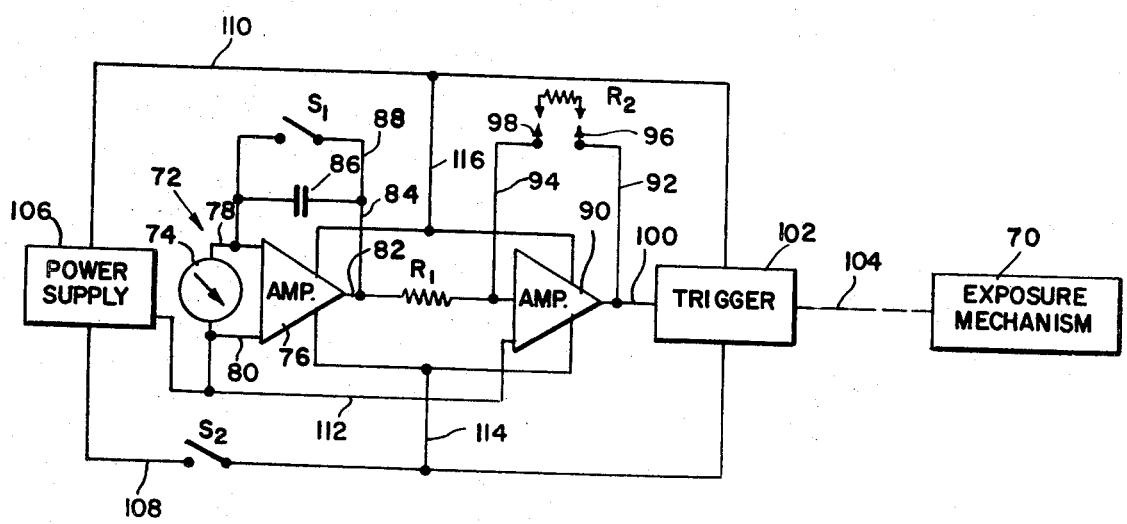
FIG. 4 is a schematic circuit diagram of an exposure control system operable in conjunction with the present invention.

Referring to FIG. 4, such an automatic exposure control system is schematically portrayed. A detailed description of the circuit illustrated in the figure may be found in copending U.S. application for Pat., Ser. No. 837,688, entitled, "Exposure Control System" by John P. Burgarella, filed June 30, 1969. The circuit may be used to control one or more exposure parameters, however, for the purpose of the present description an arrangement for controlling shutter interval through an exposure mechanism depicted generally at 70 is described.

The control circuit evaluates scene light levels with a light sensitive circuit 72. Circuit 72 is characterized in combining photovoltaic cell 74 with a differential amplification stage 76. Photovoltaic cell 74 is oriented upon camera 10 in a position permitting it to witness scene light coincidentally with the filed of view of the camera. Cell 74 is coupled with amplification stage 76 through differential input leads 78 and 80. Amplification stage 76 preferably is one sometimes referred to in the art as an "operational amplifier". When considered ideally, such amplifiers have infinite gain and infinite input impedance and a zero output impedance. The output of amplifier stage 76 is present along line 82 and is coupled with a feedback line 84. Line 84 includes a timing capacitor 86 along with a bypass 88 incorporating a synchronizing switch $S_1$ for selectively shunting capacitor 86.

With the arrangement shown, photovoltaic cell 74 is permitted to operate in a current mode, current generated by the cell being limited substantially only by its own internal impedance. With such loading, the photovoltaic cell 74 is capable of forming a desirably linear output. Accordingly, upon application of power to the system and the opening of synchronizing switch $S_1$, the linear current output of cell 74 will be integrated at capacitor 86 in a nearly ideal fashion to achieve a somewhat linear output at output line 82. The signal at output 82 from light sensing circuit 72 is introduced through a calibrating input resistor $R_1$ into a second amplification stage 90. At stage 90, the gain of the signal from light sensing circuit 72 is adjusted in accordance with the sensitometric properties of the film being used with the control system and in accordance with the temperature at which the self-developing system is operated. Amplifier 90 may be structured identically with amplification stage 76 and incorporates lines 92 and 94 leading respectively to contacts 96 and 98, which when joined with a resistance $R_2$, form a feedback path. The gain of amplifier 90 is selectively adjusted in accordance with the value of resistance of resistor $R_2$. As described more fully later, resistor $R_2$ may be thermally responsive such as a thermistor and may be affixed at a select location upon the outer surface of disposable film cassette 32. An adjusted signal output from amplification stage 90 is directed along line 100 to a trigger circuit 102. Trigger 102 responds to the signal from line 100 reaching a predetermined reference level, termed a trigger level, to cause exposure mechanism 70 to selectively terminate an exposure. Functional interconnection between trigger 102 and exposure mechanism 70 is indicated at dashed line 104.

Figure 5:
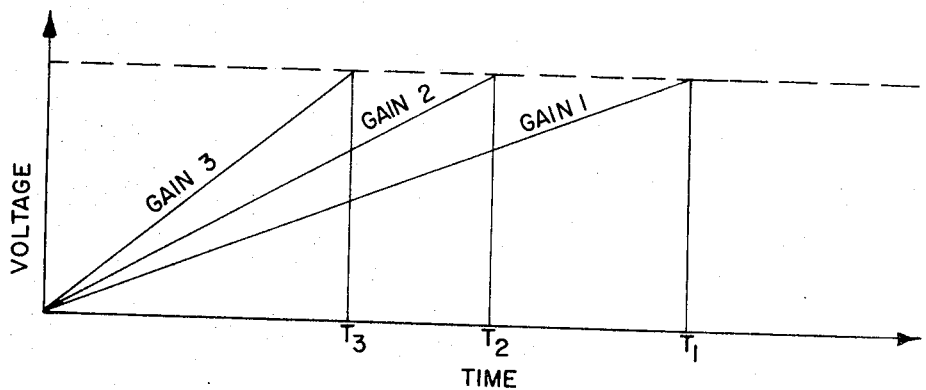
FIG. 5 is a graph illustrating the effect of gain variation upon trigger voltage level generation time of the film speed adjustment stage of the circuit of FIG. 4.

The arrangement of resistors $R_1$ and $R_2$ in the circuit provides an ideal sensitometric adjustment, trim and calibration system. When the resistors are associated with the differential amplifier in the arrangement illustrated, the gain "A", of amplifier 90 closely approximates the ratio of the resistance values $r_1$ and $r_1$, respectively, for resistors $R_2$ and $R_1$, i.e. $A=r_2/r_1$. The system may be calibrated with one resistor element, for instance $R_1$ and adjusted for film speed with the other, for instance $R_2$. Note that the gain, "A", varies in direct proportion with the resistance of resistor $R_2$. Such direct proportioning greatly simplifies the selection of a resistor unit for use in adjusting the system for different film speeds as well as for temperature responsive trim. Inasmuch as the gain, "A", varies inversely with the resistance value at $R_1$, that element alternately may be used for film speed adjustment function while $R_2$ is used for system calibration. For the latter arrangement, terminals 96 and 98 would be positioned on opposite sides of resistor $R_1$. For the embodiment shown, the exposure interval provided at exposure mechanism 70 will correspond with the time required from the opening of switch $S_1$ for the system to generate a trigger level voltage at line 100. At this point in time, trigger 102, which may be of a Schmitt variety, will actuate mechanism 70 through connection 104. Looking to FIG. 5, the effect of gain variation at amplification stage 90 is illustrated. Note that with a lowest gain, depicted as a "gain 1" a longest exposure interval time $T_1$ is present, whereas at a high gain as shown at "gain 3," a much shorter period of time $T_3$ for the system to achieve the trigger level is involved.

By using a select positive temperature coefficient thermistor as resistor $R_2$ the system will be operative to insert appropriate film speed or sensitometric data corrected in accordance with characteristics as illustrated in connection with FIG. 3 to account for processing temperatures. For the photographic properties described in connection with FIGS. 2 and 3, a positive temperature coefficient thermistor having a resistance characteristic varying by a factor of four over the range of 40° F to 100° F will properly compensate for processing temperatures above or below an optimum value. Where resistor $R_1$ is used for film speed control, the value of its resistance should be inversely proportional to film speed. Accordingly, a negative temperature coefficient thermistor may be used to insert temperature trim at that position in the circuit. With either thermistor arrangement, the thermally responsive resistor unit must be positioned within the processing environment of the camera.

Electrical power is supplied to the circuit from a power supply 106 along buses 108 and 110. The main power supply switch is shown in bus 108 at $S_2$. A ground or reference level is provided for amplification stages 76 and 90 from a line 112 emanating from power supply 106. Amplification stages 76 and 90 are shown coupled with power supply buses 108 and 110 respectively from along common connections 114 and 116.

Figure 6:
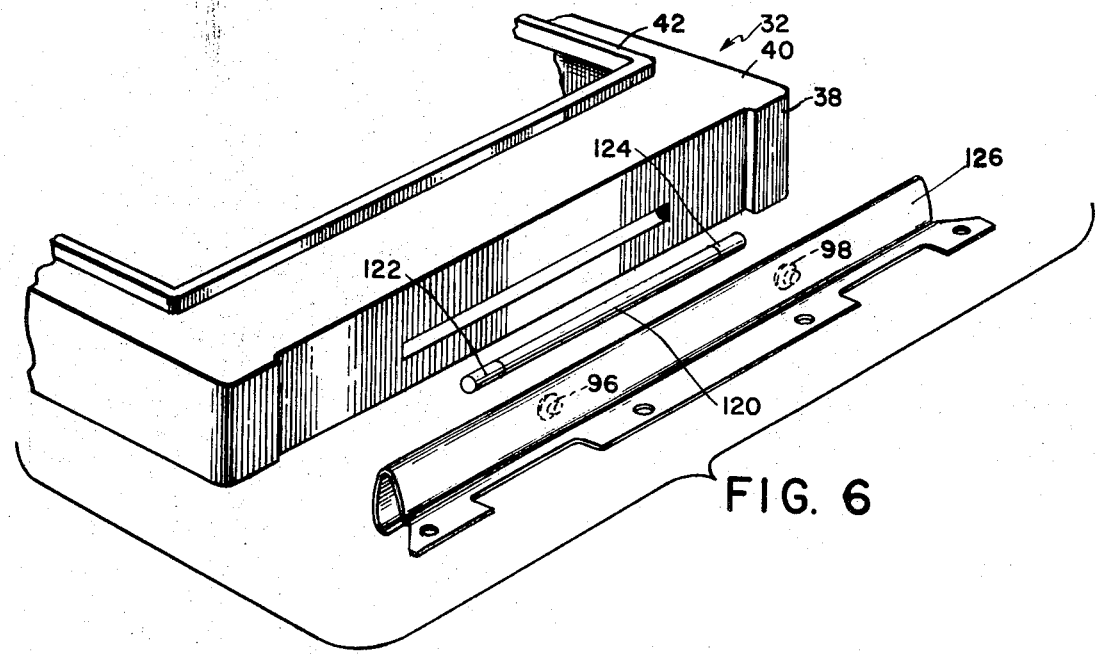
FIG. 6 is a fragmentary and exploded perspective view of a cassette structure revealing a thermistor and corresponding terminal contact member arrangement of the present invention.

Referring to FIG. 6, thermally responsive resistor component $R_2$ may be provided as a positive temperature coefficient thermistor 120 selectively mounted upon one sidewall as at 38 of cassette 32. Thermistor 120 is formed having terminal or contact areas 122 and 124 which may be a surface coating of electrically conductive material such as silver or the like. The extent of the surface covering of terminal areas 122 and 124 may be factory adjusted to calibrate the thermistor unit 120. Terminal areas 122 and 124 are oriented such that they are contactable with correspondingly oriented electrical contacts 96 and 98 which are permanently mounted upon a spring member 126 positioned within bottom cover 16 of camera 10.

Referring additionally to FIGS. 1, 7 and 8, the location of thermistor 120 within the camera body is shown as well as an arrangement for causing cassette 32 to be maneuvered into a proper orientation appropriate for operative cooperation with the film plane of the camera as well as electrical contacts 96 and 98. Contacts 96 and 98 are biased into engagement with the terminal areas 122 and 124 of thermistor 120 by virtue of the spring biased retention of cassette 32 within the aforesaid receiving chamber. Primary bias is applied to contacts 96 and 98 by spring member 126 which is secured by machine screws 128 to bottom cover 16. Contacts 96 and 98 are rivet shaped and extend through apertures formed within member 126. The contacts 96 and 98 are electrically insulated from spring member 126 by an electrically insulative insert 130 positioned intermediate the contacts and the hole through which they protrude in spring member 126. Electrical leads as at 132 couple contacts 96 and 98 with exposure control circuitry of the camera 10. Movement of cassette 32 under the bias of spring member 126 is restrained by boss member 134 or similar protruberances defining one terminus of the receiving chamber against which sidewall 36 abuts. With the spring bias arrangement shown, it will be appreciated that the contacting force exerted by contacts 96 and 98 against thermistor terminal areas 122 and 124 will be substantially consistent for all cassette units 32 inserted within the camera.

Cassette 32 is biased for abutment against elements of top supporting section 12 by a flat spring 136 fixed to the inner bottom surface of bottom cover 16. The bias exerted by spring 136 assures that the upward facing surface of the uppermost unit of film units 46 is properly positioned at the film plane of the camera. This arrangement also assures that contacts 96 and 98 will always be relatively positioned with respect to the vertical dimension of sidewall 38. Similarly, as shown in connection with FIG. 8, a spring member 138 fixed by stacking or the like to one side of bottom cover 16 abutably engages surface 140 of cassette 32 to urge the opposite side surface 142 of cassette 32 into engagement against the inner surface of the corresponding wall of bottom cover 16. This biasing action assures a consistent lateral orientation of the cassette 32 before the film plane of the camera and, additionally, assures a similar consistent lateral orientation of contacts 96 and 98 upon thermistor 120. Insertion of cassettes as at 32 within the receiving chamber is simplified by virtue of the spring arrangement thus described and is accurate by virtue of the three axis stationary abutment of certain of the surfaces of the cassette with its receiving chamber.

As discussed above, where the NTC thermistor is utilized in place of the PTC thermistor 120, it will function as resistor $R_1$ and contacts 96 and 98 would be positioned on either side of that component. Thermistor units are available in forms other than the rod configuration illustrated. For instance, they may be ribbon shaped and of regular rectangular configuration. It has been determined that the thermistors will assume the temperature of the receiving chamber of the camera within a relatively short period of time following the insertion of a cassette 32 within bottom cover 16. For instance, at the temperature differentials which may be encountered in amateur photographic practice, only a few minutes are required for bringing the temperature of the thermistor into equilibrium with that of the receiving chamber of the camera.

Since certain changes may be made in the above photographic apparatus without departing from the scope of the invention herein involved, it is intended that all matter contained in the above description or shown in the accompanying drawings shall be interpreted as illustrative and not in a limiting sense.

I Claim:

1. A photographic camera wherein materials of predetermined photographic properties are processed after exposure to form visible images, comprising:
   a camera body having a receiving chamber;
   a cassette containing a quantity of photographic material and configured for insertion within said camera body receiving chamber;
   means coupled with said camera body for causing the said photographic material to be processed following the exposure thereof;
   electrical impedance means fixed to said cassette at a predetermined location and having a resistance of a select value at a predetermined environmental temperature said impedance means exhibiting resistance values varying from said select value in correspondence with variations of said environmental temperature;
   input terminal means positioned within said receiving chamber at a predetermined location for forming circuit completing releasable contact with said electrical impedance means when said cassette is inserted within said receiving chamber; and
   an exposure system for regulating the exposure of said photographic material including control circuit means connected to said terminal means, responsive to light from said scene and to the resistance of said impedance means for controlling the amount of light admitted to said photographic material during an exposure and for compensating said exposure for the temperature related characteristics of said photographic properties during processing.

2. A photographic camera wherein material of predetermined photographic properties are processed after exposure to form visible images, comprising:
   a camera body having a receiving chamber;
   a cassette containing a quantity of photographic material and configured for insertion within said camera body receiving chamber;
   means coupled with said camera body for causing the said photographic material to be processed following the exposure thereof;
   an exposure system for regulating the exposure of said photographic material including control circuit means responsive to light from said scene and to a select value of electrical resistance corresponding to said photographic properties for controlling the amount of light admitted to said photosensitive material during an exposure;
   electrical impedance means fixed to said cassette at a predetermined location and having a resistance of said select value at a predetermined environmental temperature optimum for said processing, said impedance means exhibiting resistance values varying from said select value in correspondence with variations of said environmental temperature from said optimum temperature for adjusting the amount of said light admitted by said exposure system to compensate for the temperature related characteristics of said photographic properties during processing; and
   input terminal means connected with said control circuit means and positioned within said receiving chamber at a predetermined location for forming circuit completing releasable contact with said electrical impedance means when said cassette is inserted within said receiving chamber.

3. The photographic camera of claim 1 wherein said electrical impedance means comprises at least one thermistor affixed to said cassette.

4. The photographic camera of claim 1 wherein said electrical impedance means, when coupled with said input terminal means, is operative to cause said control circuit means to increase said exposure value in correspondence with decreases in said environmental temperature from said predetermined temperature.

5. The photographic camera of claim 1 wherein said electrical impedance means, when coupled with said input terminals, is operative to cause said control circuit means to decrease the said exposure value with corresponding increases in said environmental temperature above said predetermined temperature.

6. The photographic camera of claim 1 wherein said electrical impedance means, when coupled with said input terminals, is operative to cause said control circuit means to increase the said exposure value with corresponding decreases in environmental temperature below said predetermined temperature and to decrease the said exposure value with corresponding increases in environmental temperature above said predetermined temperature.

7. The photographic camera of claim 1 wherein said electrical impedance means comprises a temperature responsive resistor fixed to an outer surface of said cassette and having terminal surfaces contactable in circuit completing relationship with said input terminal means.

8. The photographic apparatus of claim 1 in which said contact means comprises spring loaded contact members fixed to said receiving chamber at a predetermined location.

9. The photographic apparatus of claim 8 in which said receiving chamber includes biasing means arranged to engage said cassette and retain said cassette in consistent relative position at a film plane and before said contact members.

10. The photographic camera of claim 1 in which said control circuit means includes:
    light sensitive circuit means for deriving an output signal responsive to the light levels of said scene;
    amplifier means coupled to receive said output signal and having a gain variable as a function of said photographic properties; and
    gain control means coupled with said amplifier means and said input terminal means for adjusting said amplifier means variable gain in accordance with said value of resistance.

11. The photographic camera of claim 10 wherein;
    said amplifier means comprises a differential amplifier; and
    said gain control means includes a feedback circuit arranged to insert said value of resistance between the input and output of said differential amplifier.

12. The photographic camera of claim 11 in which said electrical impedance means comprises at least one positive temperature coefficient thermistor.

13. The photographic camera of claim 10 wherein:
    said amplifier means comprises a differential amplifier; and said gain control means includes an input impedance to said differential amplifier.

14. The photographic camera of claim 13 wherein said electrical impedance means includes at least one negative temperature coefficient thermistor.

15. A cassette for use in a photographic camera in which a photosensitive material is exposed and developed as an adjunct to said exposure comprising:
a cassette body;
a quantity of photosensitive material disposed within said cassette body and having predetermined photographic properties variable over a given range of temperature levels of the environment of said development; and
electrical impedance means fixed to said cassette body at a predetermined location, having terminals for forming circuit completing contact with corresponding terminals of an exposure control circuit within said camera and having select values of electrical resistance between said terminals functionally related to said photographic properties as they occur over said given range of environmental temperature levels for inserting a temperature compensated preexposure operational setting into said exposure control circuit.

16. The cassette of claim 15 wherein said electrical impedance means has a predetermined value of electrical resistance between said terminals at a predetermined environmental temperature of said development, said value of resistance being variable from said predetermined value in correspondence with variations of said environmental temperature form said predetermined temperature.

17. The photographic camera of claim 15 wherein said electrical impedance means comprises at least one thermistor affixed to said cassette body.